United States Patent [19]
McGinn

[11] Patent Number: 4,766,391
[45] Date of Patent: Aug. 23, 1988

[54] VIDEO DEMODULATOR SYSTEM
[75] Inventor: Michael McGinn, Scottsdale, Ariz.
[73] Assignee: Motorola, Inc., Schaumburg, Ill.
[21] Appl. No.: 80,934
[22] Filed: Aug. 3, 1987
[51] Int. Cl.[4] .............................................. H04N 5/44
[52] U.S. Cl. ...................................... 329/50; 358/23; 358/188
[58] Field of Search ................. 329/50, 122, 123, 124; 358/23, 188; 455/324

[56] References Cited
U.S. PATENT DOCUMENTS
3,697,685 10/1972 Lunn .................................. 329/50 X
4,709,408 11/1987 Itakura et al. ..................... 329/50 X Primary Examiner—Eugene R. LaRoche
Assistant Examiner—Robert J. Pascal
Attorney, Agent, or Firm—Michael D. Bingham

[57] ABSTRACT

A demodulator system is disclosed which receives a modulated signal to be detected comprising first and second cascoded limiter stages; a phase locked loop (PLL) coupled to outputs of the second limiter stage and having a pair of outputs at which a signal representative of the modulated signal and including a voltage controlled oscillator operated at half the frequency of the modulated signal and third and fourth cascoded limiter stages; a phase shift circuit receiving the modulated signal and a double balanced demodulator receiving both the modulated signal from the phase shift circuit and the representative signal for providing a detected signal at an output thereof.

10 Claims, 1 Drawing Sheet

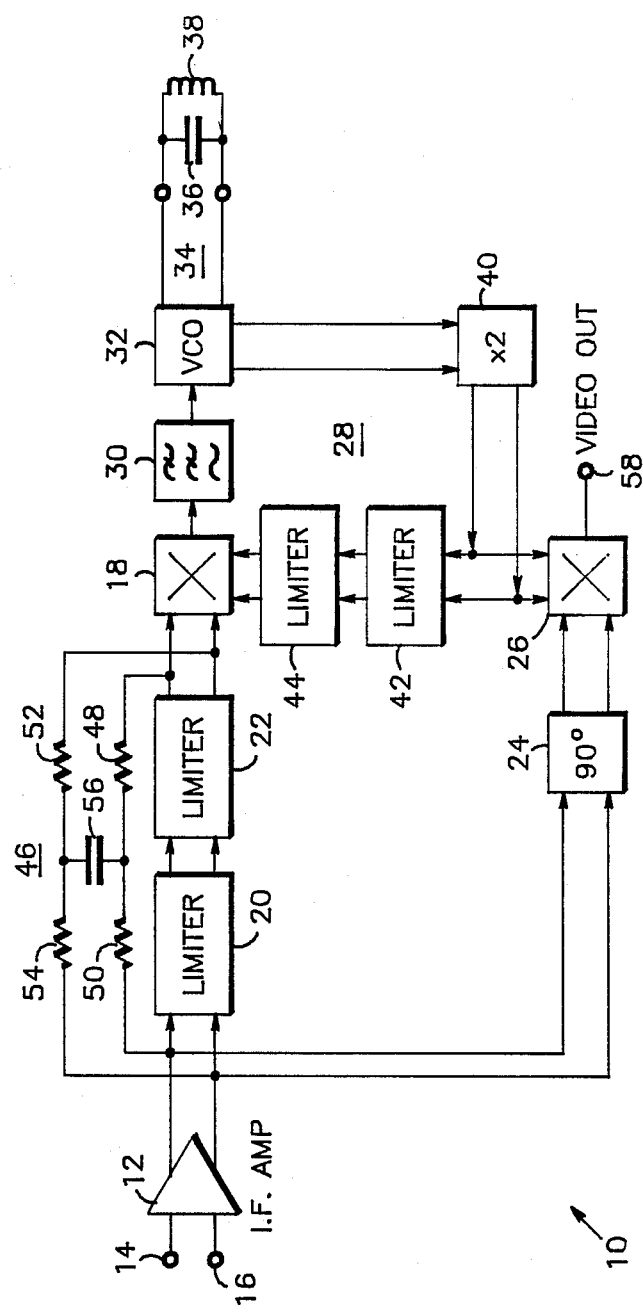

VIDEO DEMODULATOR SYSTEM

BACKGROUND OF THE INVENTION

The present invention relates to synchronous detector systems and, more particularly, to a television intermediate frequency (IF) video demodulator system.

Most television IF demodulator systems in use today are of one of two types. A first type is commonly referred to as a pseudo-synchronous video detector. An example of this type of detector is the MC1330 Low Level Video Detector circuit manufactured by Motorola, Inc. which is described in U.S. Pat. No. 3,697,685. In this system the video information is recovered by first limiting the IF video carrier signal then filtering and applying it to the first inputs of a balanced multiplier. The video information is then recovered by applying the original video carrier signal to second inputs of the multiplier as is well known.

In the second common type of video detector the same principle is used as described above except the carrier is recovered by phase locking a voltage controlled oscillator (VCO) to the IF signal and then using the VCO output as the video carrier.

The pseudo-synchronous approach suffers from several disadvantages the chief of which is the need for use of a low Q tuned circuit. This tuned circuit gives rise to quadrature distortion which leads to high sound-chroma beat frequency products which is undesirable. In addition the system requires an external tuned circuit to be connected directly to the output of the IF amplifier which causes stability and circuit layout problems. Finally the psuedo-synchronous approach exhibits relatively poor differential gain and phase performance.

The second approach described above has less quadrature distortion due to the narrow phase locked loop (PLL) bandwidth and therefor produces lower beat frequency products. However, to achieve acceptable differential phase and gain performance an extra tuned circuit has to be used at the output of the limiter stage. This causes increased stability problems associated with the IF amplifier stage as well as circuit layout problems. Further, the PLL demodulator system tends to lock to itself due to the VCO oscillating signal, which is at the same frequency as the video carrier, radiating into the input of the IF amplifier which decreases the sensitivity of the demodulator system.

Hence, a need exists for an improved video detector system which overcomes the problems of the prior art systems.

SUMMARY OF THE INVENTION

Accordingly, it is an object of the present invention to provide an improved demodulator system.

It is another object of the present invention to provide an improved video demodulator system for recovering the video signal from a television composite signal.

Still another object of the present invention is to provide an improved integrated video demodulator system having improved phase and gain characteristics.

In accordance with the above and other objects there is provided a demodulator system for detecting a modulated signal comprising first and second cascoded limiter stages; a phase locked loop (PLL) coupled to outputs of the second limiter stage and having a pair of outputs at which a signal representative of the modulated signal is provided and including a voltage controlled oscillator operated at half the frequency of the modulated signal and third and fourth cascoded limiter stages; a phase shift circuit receiving the modulated signal and a double balanced demodulator receiving both the modulated signal from the phase shift circuit and the representative signal for providing a detected signal at an output thereof.

BRIEF DESCRIPTION OF THE DRAWING

The sole FIGURE is a partial schematic and block diagram illustrating the video demodulator system of the preferred embodiment.

DETAILED DESCRIPTION OF THE PREFERRED EMBODIMENT

Turning now to the drawing, there is shown improved intermediate frequency (IF) amplifier phase locked loop video demodulator 10 of the present invention. Demodulator 10 includes balanced IF amplifier 12 which is adapted to receive an IF television signal at inputs 14 and 16. Inputs 14 and 16 typically are coupled to the antenna of the television via a tuner, neither of which are shown, as is understood to those skilled in the art. The IF signal in which the video carrier information is embedded is amplified and then applied to the cascoded limiter stages 20 and 22 which strip the amplitude modulation therefrom by limiting the magnitude of the signal. The IF signal is also applied to phase shifter 24 which shifts the phase thereof by ninety (90) degrees before the signal is applied to a first pair of inputs of balanced demodulator 26. The outputs of limiter stage 22 are applied to the inputs of quadrature phase detector 18 of nested phase locked loop (PLL) 28. PLL 28 also includes a low pass filter 30 coupled between phase detector 28 and voltage controlled oscillator (VCO) 32. VCO 32 is tuned to one-half the frequency of the video carrier frequency by tuned circuit 34 comprising capacitor 36 and inductive element 38. In this manner radiation from VCO 32 back to the input of IF amplifier 12 is eliminated since the frequencies of the two components are different. This eliminates the PLL push problems associated with some prior art PLL video detector system. The outputs of VCO 32 are applied to a times 2 multiplier circuit 40 which doubles the frequency of the oscillation signals from the former. The outputs of multiplier 40 are applied to a second pair of cascoded limiter stages 42 and 44 the outputs of the latter being coupled to phase detector 18. The inclusion of limiter stages 42 and 44, which have identical characteristics to limiter stages 20 and 22, eliminate any incremental phase errors therebetween such that the phase of the VCO signal is maintained at zero degrees to the video carrier frequency at the video demodulator 26. The outputs of multiplier 40 are applied at a second pair of inputs of double balanced demodulator 26 in phase to the intermediate frequency video carrier signal.

Feedback circuit 46 comprising resistors 48 and 50 series connected between a first output of limiter stage 22 and a first input of limiter stage 20 as well as series connected resistors 52 and 54 coupled between the other output of limiter stage 22 and input of limiter stage 20 in conjunction with capacitor 56 eliminates any phase error associated with offsets in the two limiter stages.

In operation, as long as the IF signal is within the lock up range of PLL 28 the video carrier signal will be detected and demodulated by video detector 10 to provide the video information signal at output 58.

The above described IF amplifier video detector system, which is suited to be manufactured in integrated circuit form, overcomes the problems of pseudo-synchronous and synchronous PLL detector systems. The two stage limiting between the IF amplifier and the PLL contrasts with the usual single stage of limiting with no feedback as found in the prior art. Thus, poor differential phase and gain performance of prior art circuits that result from large voltage swings required due to single stage limiting are overcome by video detector 10 of the present invention. Further, direct current feedback circuit 46 removes the effects of limiter stage offsets which are another source of poor differential phase and gain performances of prior art systems. In addition, by operating VCO 32 of PLL 28 at half the IF frequency and then frequency doubling on the integrated chip avoids desensitization of the system. This means radiation from the external frequency determining components (capacitor 36 and coil 38) will be at half the IF signal and will not be picked up by IF amplifier 12.

Hence, what has been described above is a novel IF amplifier video demodulator system which includes a two stage limiting and PLL scheme for eliminating poor phase and gain characteristics of prior art video detector systems.

I claim:

1. A demodulator system for detecting a modulated input signal, comprising:
   first and second cascoded limiter stages for limiting the amplitude of the input signal applied to said first limiter stage;
   a phase locked loop (PLL) coupled to the output of said second limiter stage for providing an output signal at outputs thereof representative of the input signal, said PLL including a voltage controlled oscillator (VCO) operated at half the frequency of the input signal and third and fourth cascoded limiter stages;
   a phase shift circuit receiving the input signal for providing a predetermined amount of phase shift thereto; and
   a double balanced demodulator circuit receiving both said phase shifted input signal and said representative signal for demodulating the input signal to provide a detected output signal.

2. The demodulator system of claim 1 including direct current (dc) feedback circuit coupled between the output of said second limiter stage and the input of said first limiter stage.

3. The demodulator system of claim 2 wherein said PLL includes:
   phase detector circuit coupled to said output of said second limiter stage and the output of said fourth limiter stage for providing an error signal whenever the limited input signal is other than in phase quadrature to the VCO signal;
   a low pass filter coupled between said phase detector means and said VCO; and
   multiplier means coupled between the output of said VCO and the input of said third limiter stage for doubling the frequency of said VCO signal to provide said representative signal.

4. The demodulator system of claim 3 wherein said dc feedback circuit includes:
   first and second resistors series coupled between a first output of said second limiter stage and a first input of said first limiter stage;
   third and fourth series coupled resistors coupled between a second output of said second limiter stage and a second input of said first limiter stage; and
   capacitive means coupled between the interconnections of said first and second resistors and said third and fourth resistors.

5. The demodulator system of claim 4 including an amplifier receiving the input signal and having first and second outputs coupled both to said first and second inputs of said first limiter stage and inputs of said phase shift circuit.

6. An integrated demodulator system for detecting a modulated input signal, comprising:
   first and second cascoded limiter stages for limiting the amplitude of the input signal applied to said first limiter stage;
   a phase locked loop (PLL) coupled to the output of said second limiter stage for providing an output signal at outputs thereof representative of the input signal, said PLL including a voltage controlled oscillator (VCO) operated at half the frequency of the input signal and third and fourth cascoded limiter stages;
   a phase shift circuit receiving the input signal for providing a predetermined amount of phase shift thereto; and
   a double balanced demodulator circuit receiving both said phase shift input signal and said representative signal for demodulating the input signal to provide a detected output signal.

7. The demodulator system of claim 6 including direct current (dc) feedback circuit coupled between the output of said second limiter stage and the input of said first limiter stage.

8. The demodulator system of claim 7 wherein said PLL includes:
   phase detector circuit coupled to said output of said second limiter stage and the output of said fourth limiter stage for providing an error signal whenever the limited input signal is other than in phase quadrature to the VCO signal;
   a low pass filter coupled between said phase detector means and said VCO; and
   multiplier means coupled between the output of said VCO and the input of said third limiter stage for doubling the frequency of said VCO signal to provide said representative signal.

9. The demodulator system of claim 8 wherein said dc feedback circuit includes:
   first and second resistors series coupled between a first output of said second limiter stage and a first input of said first limiter stage;
   third and fourth series coupled resistors coupled between a second output of said second limiter stage and a second input of said first limiter stage; and
   capacitive means coupled between the interconnections of said first and second resistors and said third and fourth resistors.

10. The demodulator system of claim 9 including an amplifier receiving the input signal and having first and second outputs coupled both to said first and second inputs of said first limiter stage and inputs of said phase shift circuit.

* * * * *